US010671372B2

(12) United States Patent
Marks et al.

(10) Patent No.: US 10,671,372 B2
(45) Date of Patent: Jun. 2, 2020

(54) BLOCKCHAIN-BASED SECURE CUSTOMIZED CATALOG SYSTEM

(71) Applicant: Dell Products L.P., Round Rock, TX (US)

(72) Inventors: Kevin T. Marks, Georgetown, TX (US); Viswanath Ponnuru, Karnataka (IN); Raveendra Babu Madala, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 16/178,229

(22) Filed: Nov. 1, 2018

(65) Prior Publication Data

US 2020/0142682 A1    May 7, 2020

(51) Int. Cl.
*G06F 8/65* (2018.01)
*G06Q 20/38* (2012.01)
(Continued)

(52) U.S. Cl.
CPC .................. *G06F 8/65* (2013.01); *G06F 8/71* (2013.01); *G06F 16/182* (2019.01); *G06F 16/27* (2019.01);
(Continued)

(58) Field of Classification Search
CPC ... G06F 8/65; G06F 8/71; G06F 16/27; G06F 16/182; G06F 21/57; G06Q 20/382; H04L 9/0643; H04L 2209/38
See application file for complete search history.

(56) References Cited

U.S. PATENT DOCUMENTS 9,849,364 B2 * 12/2017 Tran .................. H04L 67/12
9,990,504 B1 * 6/2018 Chapman ............ H04L 9/3231
(Continued)

FOREIGN PATENT DOCUMENTS

WO    WO-2019033074 A1 *  2/2019    ............. G06Q 20/36

OTHER PUBLICATIONS

Kapitonov et al., "Blockchain-based protocol of autonomous business activity for multi-agent systems consisting of UAVs", 2017, IEEE (Year: 2017).*
(Continued)

*Primary Examiner* — Wei Y Zhen
*Assistant Examiner* — Junchun Wu
(74) *Attorney, Agent, or Firm* — Haynes and Boone, LLP

(57) ABSTRACT

A blockchain-based secure customized catalog system includes a catalog customization system that receives a request to customize a first software catalog, and modifies the first software catalog to create a second software catalog that is customized for computing devices in a computing system. The catalog customization system then generates and broadcasts a first blockchain transaction that includes a smart contract having a second software catalog hash created from the second software catalog. A blockchain device receives the first blockchain transaction and, in response, provides the smart contract on a blockchain. When the blockchain device receives a second blockchain transaction broadcast by the computing system and including a hash value, it executes the smart contract. If the blockchain device determines that the execution of the smart contract indicates that the hash value matches the second software catalog hash, it transmits a second software catalog verification to the computing system.

20 Claims, 7 Drawing Sheets

(51) Int. Cl.
*G06F 8/71* (2018.01)
*H04L 9/06* (2006.01)
*G06F 21/57* (2013.01)
*G06F 16/27* (2019.01)
*G06F 16/182* (2019.01)

(52) U.S. Cl.
CPC ............ *G06F 21/57* (2013.01); *G06Q 20/382* (2013.01); *H04L 9/0643* (2013.01); *H04L 2209/38* (2013.01)

(56) References Cited

U.S. PATENT DOCUMENTS

| | | | | |
|---|---|---|---|---|
| 9,992,014 | B2* | 6/2018 | McGregor, Jr. | H04L 9/0836 |
| 10,158,479 | B2* | 12/2018 | Chapman | G06F 16/23 |
| 10,243,748 | B1* | 3/2019 | Callan | H04L 9/3239 |
| 2002/0046400 | A1* | 4/2002 | Burch | G06F 8/48 717/154 |
| 2014/0279985 | A1* | 9/2014 | Fontenot | G06F 21/51 707/698 |
| 2017/0207910 | A1* | 7/2017 | McGregor, Jr. | H04L 9/0836 |
| 2017/0344988 | A1* | 11/2017 | Cusden | H04L 9/3247 |
| 2017/0353309 | A1* | 12/2017 | Gray | G06F 21/53 |
| 2018/0018723 | A1* | 1/2018 | Nagla | G06Q 20/4014 |
| 2018/0088928 | A1* | 3/2018 | Smith | H04L 67/34 |
| 2018/0109516 | A1* | 4/2018 | Song | H04L 9/3263 |
| 2018/0174094 | A1* | 6/2018 | Ren | G06Q 10/087 |
| 2018/0176229 | A1* | 6/2018 | Bathen | G06F 8/65 |
| 2019/0108140 | A1* | 4/2019 | Deshpande | G06F 21/62 |
| 2019/0114182 | A1* | 4/2019 | Chalakudi | H04L 9/3236 |
| 2019/0147532 | A1* | 5/2019 | Singh | H04L 9/3239 705/35 |
| 2019/0207749 | A1* | 7/2019 | McKellar | G06F 21/64 |
| 2019/0303942 | A1* | 10/2019 | Balaraman | G06Q 20/4016 |

OTHER PUBLICATIONS

Steichen et al., "Blockchain-Based, Decentralized Access Control for IPFS", 2018, IEEE (Year: 2018).*

Red, "Practical Comparison of Distributed Ledger Technologies for IoT", 2017, SPIE, SPIEDigitalLibrary.org/conference-proceedings-of-spie (Year: 2017).*

Chen et al., "Research and Application of Warehouse Receipt Transaction Based on Smart Contract on the Blockchain", 2018, Atlantis Press (Year: 2018).*

Ryan, "Smart Contract Relations in e-Commerce: Legal Implications of Exchanges Conducted on the Blockchain", Oct. 2017, Technology Innovation Management Review, vol. 7, Issue 10 (Year: 2017).*

Maksym Trilenko, "Blockchain As a Tool for Providing Proof of Authenticity, Proof of Integrity and Proof of Authorship for Digital and Digitalized Information," 5 Pages, Jun. 13, 2017.

* cited by examiner

US 10,671,372 B2

BLOCKCHAIN-BASED SECURE CUSTOMIZED CATALOG SYSTEM

BACKGROUND

The present disclosure relates generally to information handling systems, and more particularly to using a blockchain to provide secure customized catalogs for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, networking devices, storage devices, and/or other computing systems, often utilize software catalogs that provide for the updating of software on the components in the computing system. The software catalogs may be created by a computing system provider, and include metadata that allows the computing system to retrieve and install a variety of software updates (e.g., BIOS updates, driver updates, firmware updates, and/or other software updates known in the art) for each of its many different components. Such software catalogs are then cryptographically signed by the computing system provider, and made available to customers via a computing system provider website for use in updating the software on their computing systems. The software catalogs provide several advantages, including the ability to provide for the update of software on each of the components on a computing system, rather than providing for those updates on the computing system components one-by-one. However, many customers utilize computing systems that do not require each of the updates provided in the software catalog by the computing system provider, as their computing system(s) may not include each of the components for which software updates are provided in the software catalog. As such, the computing system provider may provide a catalog customization system (e.g., via the computing system provider website) that allows for the customization of the software catalog created by the computing system provider in order to create a customized software catalog that is configured to provide for the update of software only for the components actually included in the customers' computing system. The provisioning of such customized software catalogs raises a number of issues.

For example, the cryptographic signing of the software catalogs provided by the computing system provider allows a computing system to verify that the software update metadata that provides for the updates of software of its computing components is safe, and will not provide for the updating of the computing system/computing components with malicious software. However, there is no ability for the computing system provider to sign the customized software catalogs created by the customers, as those customized software catalogs are created at the customer sites (e.g., the via computer system provider website). As such, customized software catalogs are distributed to computing systems and used to provide software updates for its components without the ability to verify the software updates provided by those customized software catalogs are safe, thus leaving the computing systems vulnerable to malicious customized software catalogs that can result in the installation of malicious software on the computing systems.

Accordingly, it would be desirable to provide secure customized catalog system.

SUMMARY

According to one embodiment, an Information Handling System (IHS) includes a processing system; and a memory system that is coupled to the processing system and that includes instructions that, when executed by the processing system, cause the processing system to provide a blockchain engine that is configured to: receive a first blockchain transaction that was broadcast by a catalog customization system and that includes a first smart contract having a second software catalog hash that was created from a second software catalog that was generated by modifying a first software catalog; provide, in response to receiving the blockchain transaction, the first smart contract on a blockchain in association with a first blockchain address; receive a second blockchain transaction broadcast by a first computing system, that is directed to the first blockchain address, and that includes a first hash value; execute the first smart contract associated with the first blockchain address; and determine that the execution of the first smart contract has provided an indication that the first hash value matches the second software catalog hash and, in response, transmit a second software catalog verification to the first computing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
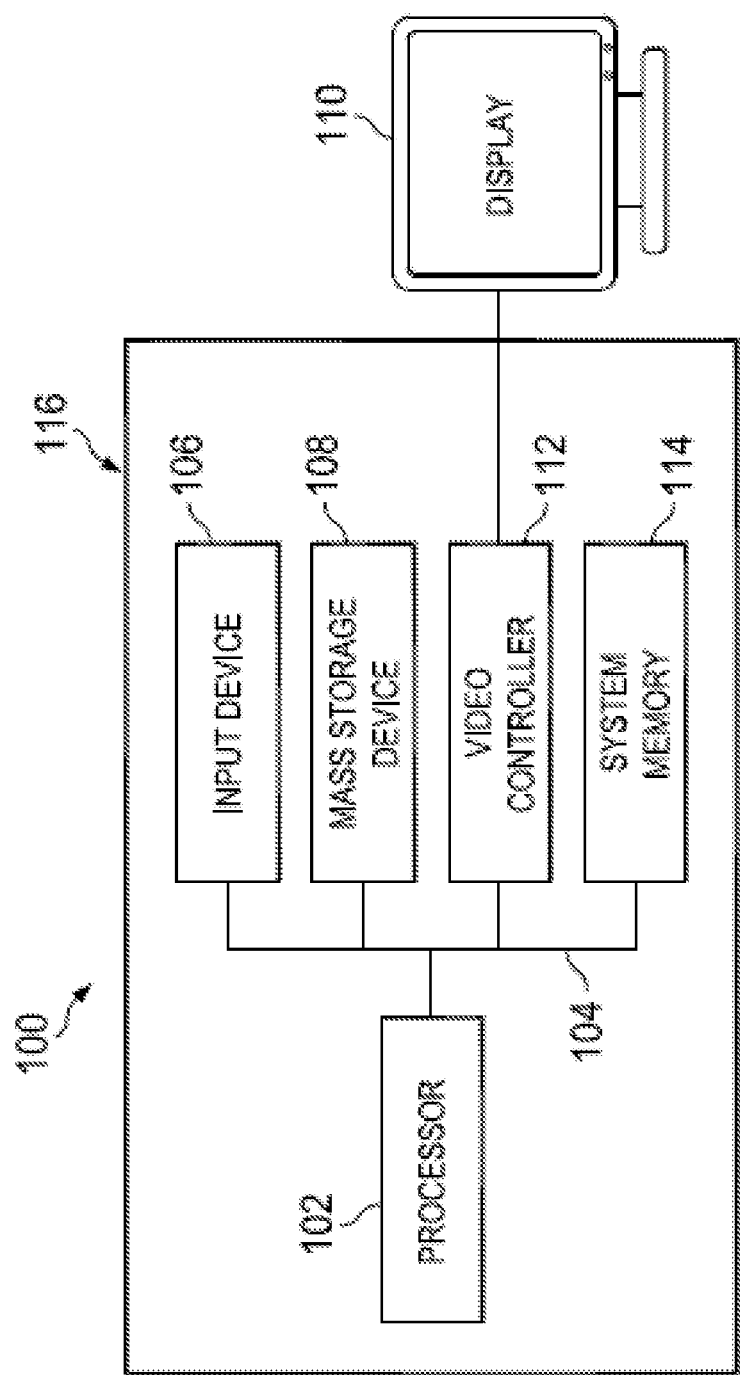
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
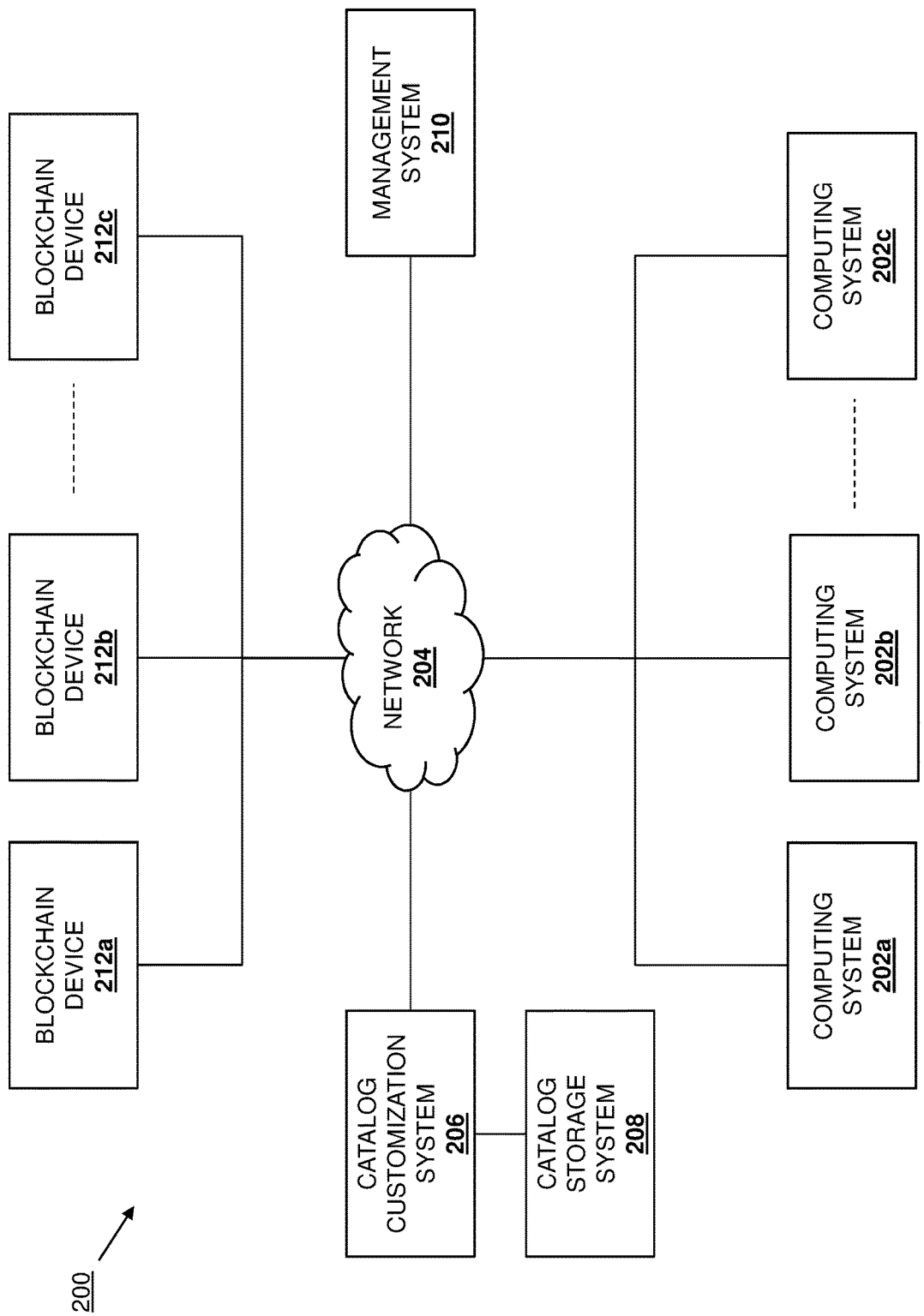
FIG. 2 is a schematic view illustrating an embodiment of a blockchain-based secure customized catalog system.

Referring now to FIG. 2, an embodiment of a blockchain-based secure customized catalog system 200 is illustrated. In the embodiments discussed below, the blockchain-based secure customized catalog system 200 is controlled by a single entity such as, for example, an operator, owner, and/or controller of a datacenter or Local Area Network (LAN) that operates, owns, and/or controls each of the devices, systems, and network that provide the functionality of the blockchain-based secure customized catalog system 200. For example, many datacenters provide one or more physical locations at which plurality of computing systems are connected via a network, and such datacenters may utilize the teachings of the present disclosure to ensure secure customized catalog provisioning for those computing systems in the manner described below. However, one of skill in the art in possession of the present disclosure will recognize that separate control (or cooperative control by a plurality of entities/consortium) of one or more of the devices, systems, and network that provide the functionality of the blockchain-based secure customized catalog system 200 will fall within the scope of the present disclosure as well.

In the illustrated embodiment, the blockchain-based secure customized catalog system 200 includes a plurality of computing systems 202a, 202b, and up to 202c. In an embodiment, any or all of the computing systems 202a-c may be provided by the IHS 100 discussed above with reference to FIG. 1, and/or may include some or all of the components of the IHS 100. In specific examples below, each of the computing systems 202a-c may include remote access controllers (e.g., the integrated DELL® Remote Access Controller (iDRAC) provided by Dell Inc. of Round Rock, Tex., United States), OpenManage Essential (OME) management consoles, and/or server devices with a plurality of server components. However, in other embodiments, the computing systems 202a-c may be provided by desktop computing devices, laptop/notebook computing devices, tablet computing devices, and/or any other computing systems that would be apparent to one of skill in the art in possession of the present disclosure.

Each of the computing systems 202a-c is coupled to a network 204 which, as discussed above, may be provided by a LAN in a datacenter in the examples below. However, other types of networks (e.g., the Internet) may be utilized in the blockchain-based secure customized catalog system 200 while remaining within the scope of the present disclosure as well. A catalog customization system 206 is coupled to each of the network 204 and a catalog storage system 208, and may be provided by the IHS 100 discussed above with reference to FIG. 1, and/or may include some or all of the components of the IHS 100. In specific examples, the catalog customization system 206 may be provided by a server device running a DELL® Repository Manager (DRM) application that is available from DELL® Inc. of Round Rock, Tex., United States, and that is configured to provide for the customization of software catalogs stored in the catalog storage system 208 as discussed below, and/or other functionality that would be apparent to one of skill in the art in possession of the present disclosure. As such, the catalog customization system 206 may be server device provided in the same datacenter as the computing systems 202a-c, and may access a computing provider website to run the DRM web application that provides the catalog customization system functionality described below. Furthermore, the catalog storage system 208 may be provided using an InterPlanetary File System (IPFS) included in a storage system provided in the same datacenter as the computing systems 202a-c. However, the catalog customization system 206 and catalog storage system 208 may be provided by a variety of other devices or systems in a variety of locations while remaining within the scope of the present disclosure as well.

A management system 210 is also coupled to the network 204, and may be provided by the IHS 100 discussed above with reference to FIG. 1, and/or may include some or all of the components of the IHS 100. In the specific examples discussed below, the management system 210 is provided in the same datacenter as the computing systems 202a-c, and is utilized by an entity associated with the computing systems 202a-c (e.g., a network administrator) in order to customize catalogs for providing software updates to the computing systems 202a-c. However, the management system 210 may also be controlled by entities unassociated with the computing systems 202a-c while remaining within the scope of the present disclosure as well. In the illustrated embodiment, a plurality of blockchain devices 212a, 212b, and up to 212c are also coupled to the network 204. In an embodiment, any or all of the blockchain devices 212a-c may be provided by the IHS 100 discussed above with reference to FIG. 1, and/or may include some or all of the components of the IHS 100. In specific examples, the blockchain devices 212a-c may include one or more server devices and/or other blockchain maintaining computing devices that would be apparent to one of skill in the art in possession of the present disclosure. As discussed above, in some examples, the blockchain devices 212a-c may be provided in the same datacenter as the computing devices 202a-c, and controlled by one or more entities to maintain a "private/centralized blockchain" that provides the functionality discussed below. However, in other examples, the blockchain devices 212a-c may be in any of a variety of locations, coupled to the Internet, and controlled by unrelated entities to maintain a "public/decentralized blockchain" that provides the functionality discussed below. While a specific blockchain-based secure customized catalog system 200 has been illustrated and described, one of skill in the art in possession of the present disclosure will recognize that the functionality of the blockchain-based secure customized catalog system of the present disclosure may be enabled by a variety of devices and/or systems in a variety of configurations that will fall within the scope of the present disclosure as well.

Figure 3:
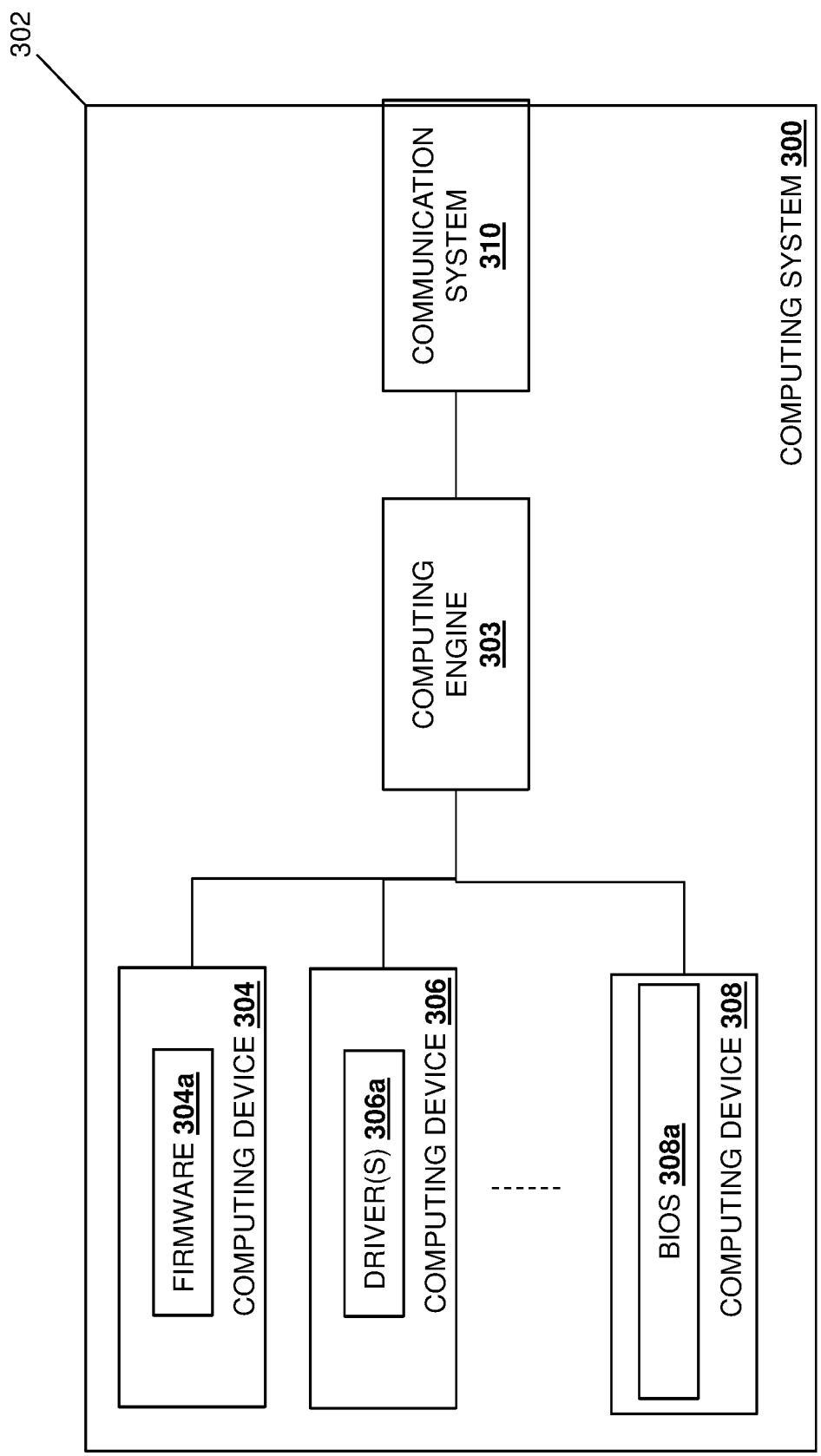
FIG. 3 is a schematic view illustrating an embodiment of a computing system used in the blockchain-based secure customized catalog system of FIG. 2.

Referring now to FIG. 3, an embodiment of a computing system 300 is illustrated that may provide any or all of the computing systems 202a-c discussed above with reference to FIG. 2. As such, the computing system 300 may be the IHS 100 discussed above with reference to FIG. 1 and/or may include some or all of the components of the IHS 100, and in specific examples may include remote access controllers (e.g., the iDRAC provided by Dell Inc. of Round Rock, Tex., United States), OpenManage Essential (OME) management consoles, server devices with a plurality of server components (e.g., a DELL® PowerEdge system available from DELL® Inc. of Round Rock, Tex., United States), or other computing systems that would be apparent to one of skill in the art in possession of the present disclosure. In the illustrated embodiment, the computing system 300 includes a chassis 302 that houses the components of the computing system 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a computing engine 303 that is configured to perform the functionality of the computing engines and computing systems discussed below.

The chassis 302 may also house a plurality of computing devices such as the computing devices 304, 306, and up to 308 illustrated in FIG. 3, each of which is coupled to the computing engine 303 (e.g., via a coupling between that computing device and the processing system.) Furthermore, any or all of the computing devices 304-308 in the computing system 300 may be associated with firmware, drivers, Basic Input/Output Systems (BIOSs), and/or other software such as, for example, the firmware 304a associated with the computing device 304, the driver 306a associated with the computing device 306, and the BIOS 308a associated with the computing device 308 in FIG. 3. However, one of skill in the art in possession of the present disclosure will recognize that the computing devices 304-308 may be provided in desktop computing devices, laptop/notebook computing devices, tablet computing devices, and/or any other computing systems known in the art, and the software associated with those computing devices may be any firmware, drivers, BIOS, and/or other software known in the art as well.

The chassis 302 may also house a communication system 310 that is coupled to computing engine 303 (e.g., via a coupling between the communication system 310 and the processing system), and may includes a Network Interface Controller (NIC), a wireless communication subsystem (e.g., a BLUETOOTH® wireless communication system, a WFi wireless communication system, etc.), and/or other communication components that allow for the communications via a network (e.g., the network 204 of FIG. 2) discussed below. However, while a specific computing system 300 has been illustrated and described, one of skill in the art in possession of the present disclosure will recognize that computing systems may include a variety of components and component configurations that would enable the functionality discussed below while remaining within the scope of the present disclosure.

Figure 4:
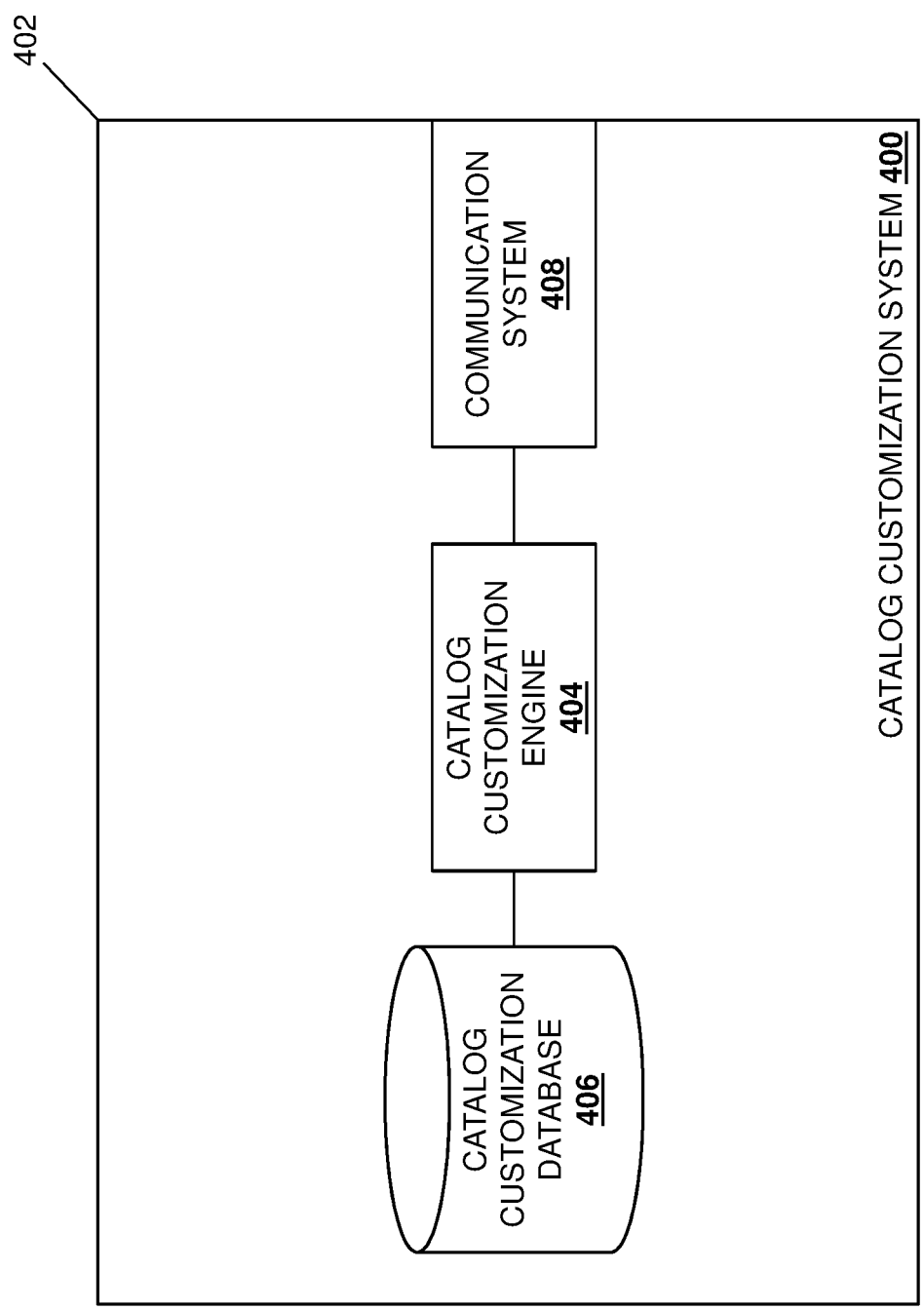
FIG. 4 is a schematic view illustrating an embodiment of a catalog customization system used in the blockchain-based secure customized catalog system of FIG. 2.

Referring now to FIG. 4, an embodiment of a catalog customization system 400 is illustrated that may provide the catalog customization system 206 discussed above with reference to FIG. 2. As such, the catalog customization system 400 may be the IHS 100 discussed above with reference to FIG. 1 and/or may include some or all of the components of the IHS 100, and in specific examples may be provided by a server device running a DRM application as discussed above. In the illustrated embodiment, the catalog customization system 400 includes a chassis 402 that houses the components of the catalog customization system 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a catalog customization engine 404 that is configured to perform the functionality of the catalog customization engines and catalog customization systems discussed below.

The chassis 402 may also house a storage system (not illustrated, but which may include the storage device 108 discussed above with reference to FIG. 1) that is coupled to the catalog customization engine 404 (e.g., via a coupling between the storage system and the processing system) and that includes a catalog customization database 406 that is configured to store any of the data and/or other information utilized by the catalog customization engine 404 as described below. The chassis 402 may also house a communication system 408 that is coupled to the catalog customization engine 404 (e.g., via a coupling between the communication system 408 and the processing system) and may includes a Network Interface Controller (NIC), a wireless communication subsystem (e.g., a BLUETOOTH® wireless communication system, a WiFi wireless communication system, etc.), and/or other communication components that allow for the communications via a network (e.g., the network 204 of FIG. 2) discussed below. However, while a specific catalog customization system 400 has been illustrated and described, one of skill in the art in possession of the present disclosure will recognize that catalog customization systems may include a variety of components and component configurations that would enable the functionality discussed below while remaining within the scope of the present disclosure.

Figure 5:
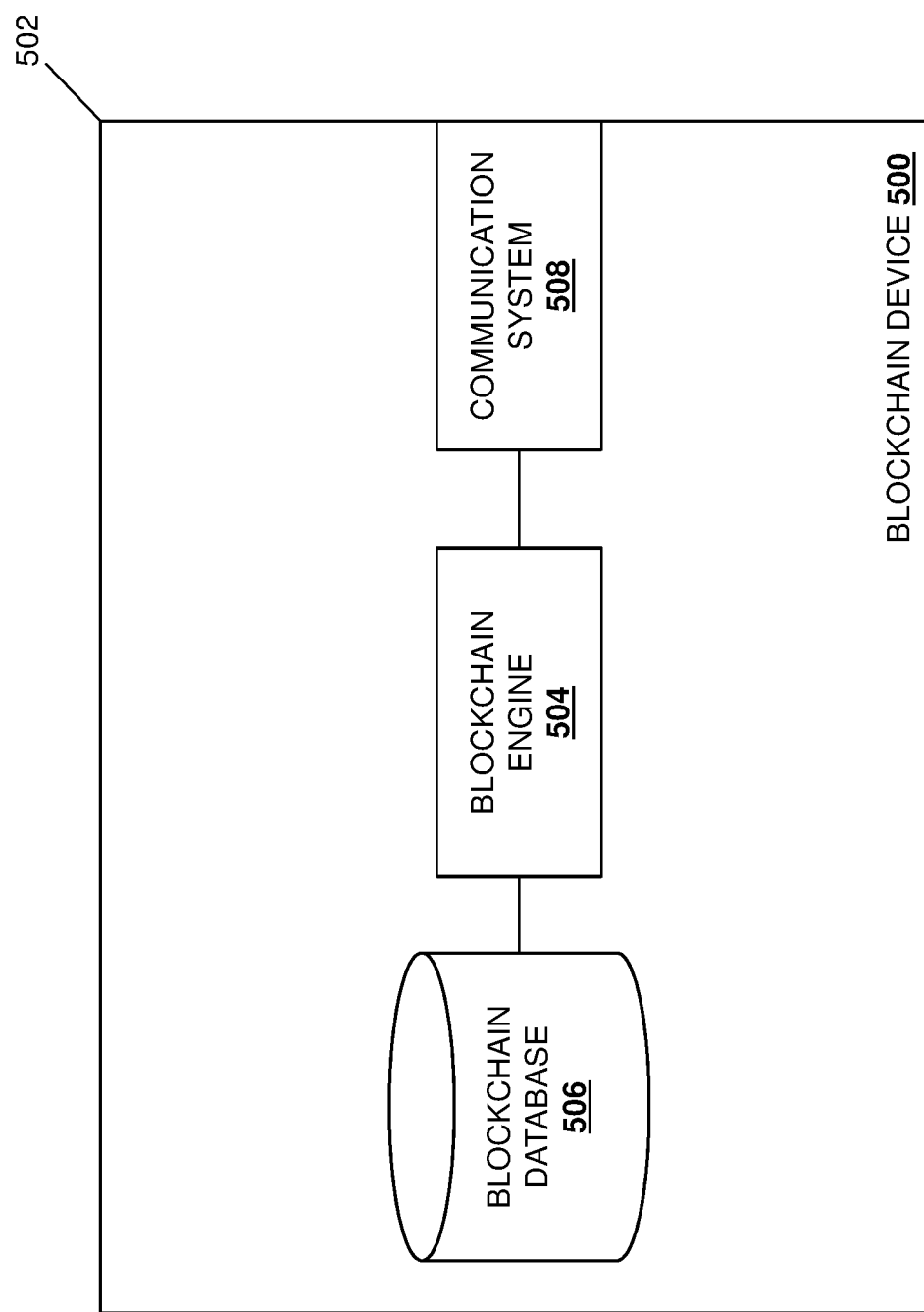
FIG. 5 is a schematic view illustrating an embodiment of a blockchain device used in the blockchain-based secure customized catalog system of FIG. 2.

Referring now to FIG. 5, an embodiment of a blockchain device 500 is illustrated that may provide any or all of the blockchain devices 212a-c discussed above with reference to FIG. 2. As such, the blockchain device 500 may be the IHS 100 discussed above with reference to FIG. 1 and/or may include some or all of the components of the IHS 100, and in specific examples may be provided by server devices and/or other blockchain maintaining computing devices that would be apparent to one of skill in the art in possession of the present disclosure. In the illustrated embodiment, the blockchain device 500 includes a chassis 502 that houses the components of the blockchain device 500, only some of which are illustrated in FIG. 5. For example, the chassis 502 may house a processing system (not illustrated, but which may include the processor 102 discussed above with reference to FIG. 1) and a memory system (not illustrated, but which may include the memory 114 discussed above with reference to FIG. 1) that is coupled to the processing system, and that includes instructions that, when executed by the processing system, cause the processing system to provide a blockchain engine 504 that is configured to perform the functionality of the blockchain engines and blockchain devices discussed below. As discussed above, in some examples, the blockchain device 500 may be configured to operate with other blockchain devices to maintain a "centralized blockchain" that is controlled by one or more entities, while in other examples, the blockchain device 500 may be configured to operate with other blockchain devices to maintain a "decentralized blockchain" that is controlled by unrelated and/or uncooperating entities.

The chassis 502 may also house a storage system (not illustrated, but which may include the storage device 108 discussed above with reference to FIG. 1) that is coupled to the blockchain engine 504 (e.g., via a coupling between the storage system and the processing system) and that includes a blockchain database 506 that is configured to store any of the data and/or other information utilized by the blockchain engine 504 as described below. The chassis 502 may also house a communication system 508 that is coupled to the blockchain engine 504 (e.g., via a coupling between the communication system 508 and the processing system) and may includes a Network Interface Controller (NIC), a wireless communication subsystem (e.g., a BLUETOOTH® wireless communication system, a WFi wireless communication system, etc.), and/or other communication components that allow for the communications via a network (e.g., the network 204 of FIG. 2) discussed below. However, while a specific blockchain device 500 has been illustrated and described, one of skill in the art in possession of the present disclosure will recognize that blockchain devices may include a variety of components and component configurations that would enable the functionality discussed below while remaining within the scope of the present disclosure.

Figure 6:
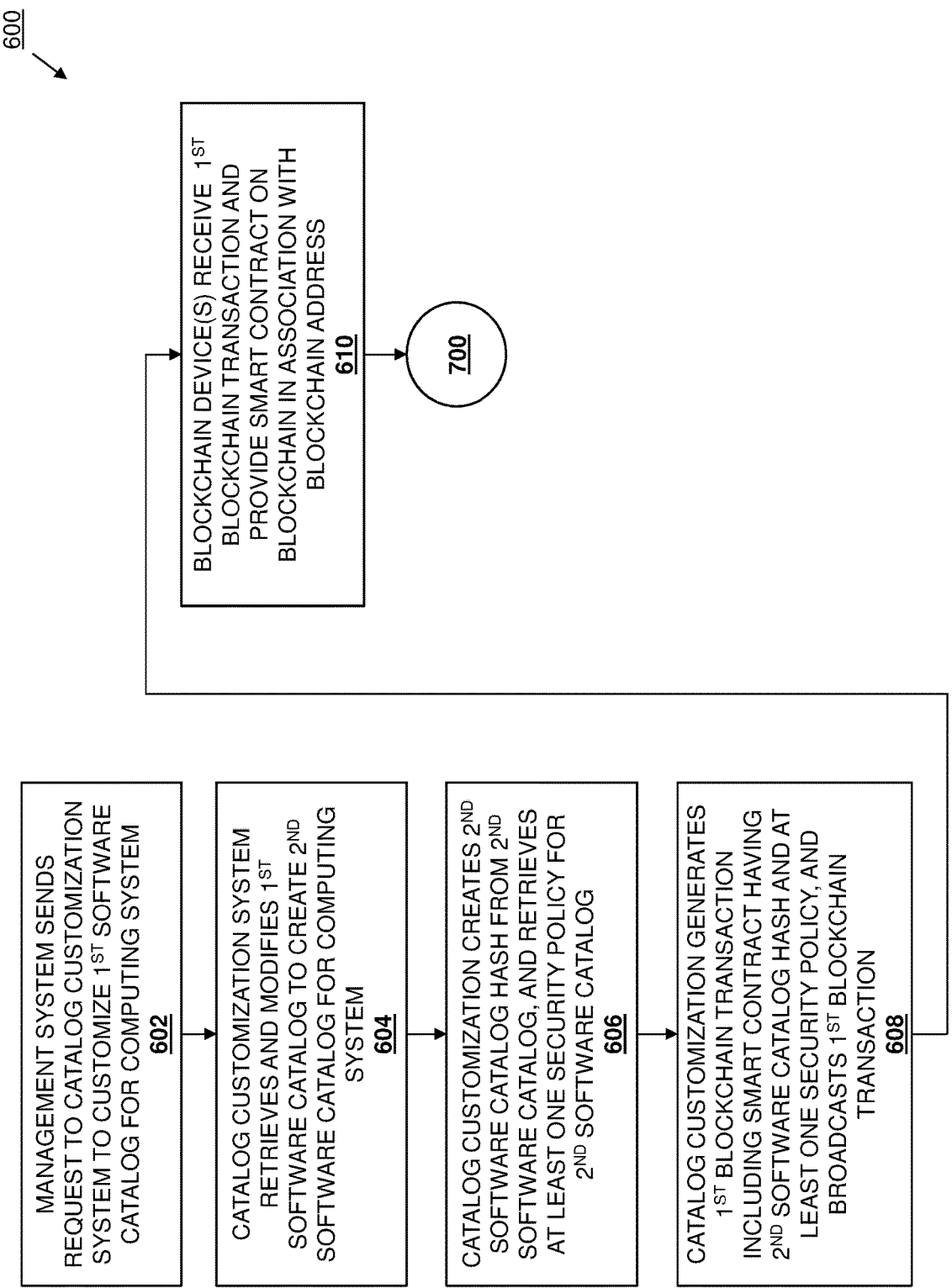
FIG. 6 is a flow chart illustrating an embodiment of a first portion of a method for providing blockchain-based secure customized catalogs.
Figure 7:
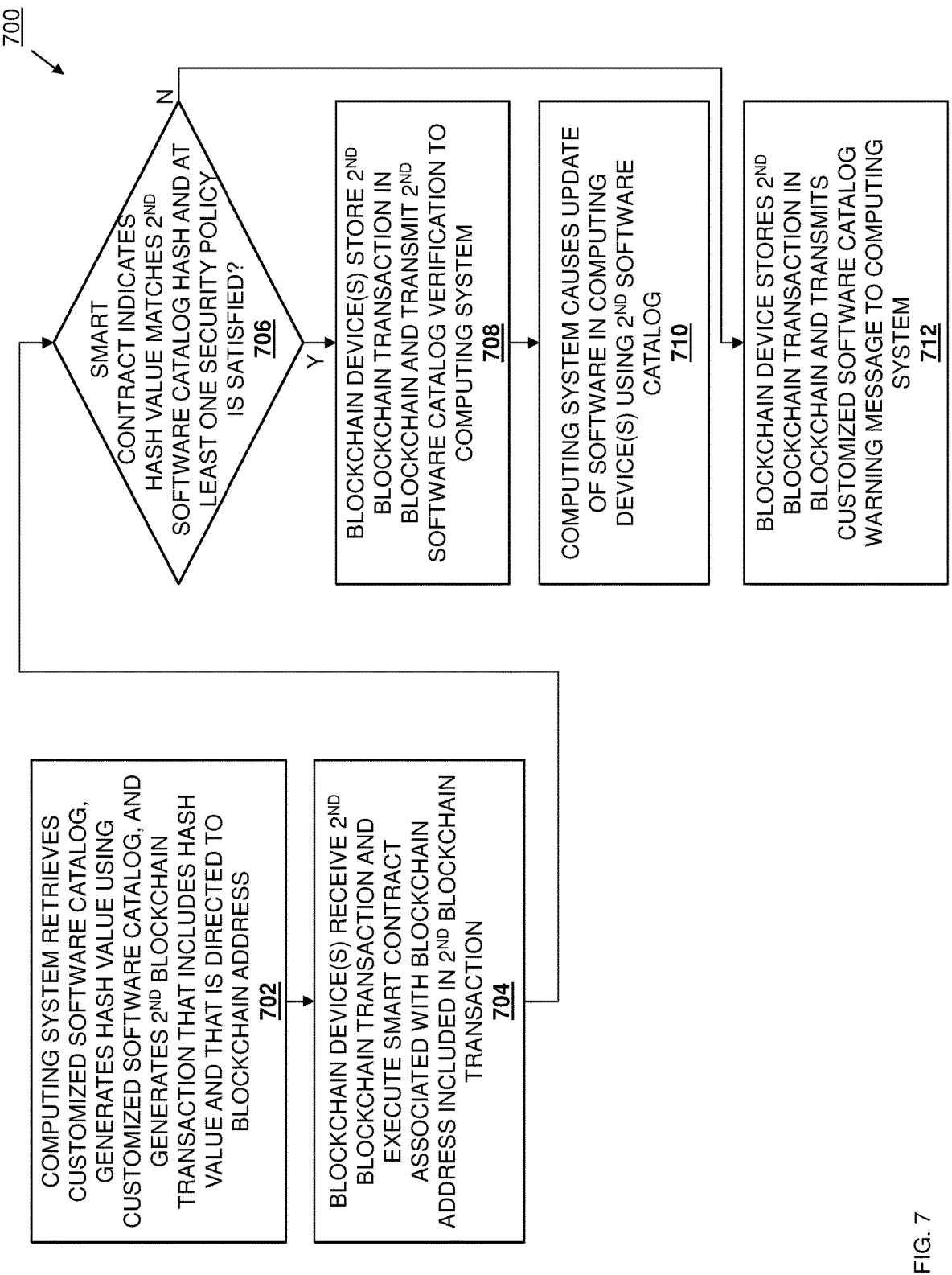
FIG. 7 is a flow chart illustrating an embodiment of a second portion of a method for providing blockchain-based secure customized catalogs.

Referring now to FIGS. 6 and 7, an embodiment of methods 600 and 700 for providing blockchain-based secure customized catalogs is illustrated. As discussed below, the systems and methods of the present disclosure utilize a blockchain to provide for the verification of customized software catalogs that have been customized by a customer from a secure software catalog that was previously created and cryptographically signed by a computing system provider. As discussed above, such customization by a customer conventionally provides customized software catalogs that are not signed by the computing system provider, and thus computing systems utilizing customized software catalogs are subject to the risk of customized software catalogs that provide malicious software updates. The systems and methods of the present disclosure remedy this issue by generating a customized software catalog hash for each customized software catalog that is created, and providing a smart contract for each customized software catalog that is created that includes its customized software catalog hash as part of a first blockchain transaction that is generated and broadcast to blockchain devices. Upon receiving that first blockchain transaction, the blockchain devices will add the smart contract to a blockchain in association with a blockchain address. Subsequently, when computing systems wish to utilize a customized software catalog, they may generate a hash value using that customized software catalog, and provide it in a second blockchain transaction that is broadcast to the blockchain devices and directed to the blockchain address. Upon receiving that second blockchain transaction, the blockchain devices will execute the smart contract at the blockchain address and, if the execution of the smart contract indicates that the hash value matches the customized software catalog hash, provide a customized software catalog verification to the computing system that provides a verification of the integrity of the customized software catalog. As such, the computing system may apply the software updates via the customized software catalog without the risk of installing malicious software.

As discussed below, the method 600 operates to provide a secure customized catalog smart contract on a blockchain. The method 600 begins at block 602 where a management system sends a request to a catalog customization system to customize a first software catalog for a computing system. In an embodiment, prior to the method 600, a computing system provider may generate a first software catalog that includes a plurality of catalog files that include metadata identifying software updates for various computing devices that may be provided in a computing system, and may cryptographically sign that first software catalog and provide access to it via, for example, a computing provider website. In some examples, the catalog customization engine 404 in the catalog customization system 206/400 may retrieve that first software catalog and store it in the catalog storage system 208 prior to the block 602.

As discussed above, many computing systems will not require each of the software updates enabled by the first software catalog provided and cryptographically signed by the computing system provider, as those computing systems may not include each of the computing devices for which software updates are provided in the first software catalog. As such, the first software catalog may include metadata identifying software updates for computing devices that are not included in the computing system 300. At block 602, a user of the management system 210 (e.g., a network administrator of the datacenter than includes the computing systems 202a-c) may use the management system to access the catalog customization system 206 (e.g., via the network 204), and identify the computing system 300 (e.g., using a Globally Unique IDentifier (GUID) for the computing system 300) in a request for a customized software catalog for that computing system 300 that is configured to cause the catalog customization system 206/400 to create a customized software catalog that is specific to the computing system 206/300 (i.e., that includes software updates for only the computing devices 304-308 included in the computing system 206/300). As such, at block 602, the catalog customization engine 404 in the catalog customization system 206/400 may receive the request for the customized software catalog through the network 204 via its communication system 408.

The method 600 then proceeds to block 604 where the catalog customization system retrieves and modifies the first software catalog to create a second software catalog for the computing system. In some embodiments, at block 604, the catalog customization engine 404 use the identity of the computing system 300 that was provided by the management system 210 in the request for the customized software catalog in order to identify the computing devices 304, 306, and up to 308 included in the computing system 300, and retrieve may retrieve the first software catalog via a computing system provider website, or via the catalog customization database 406. For example, with the computing system 300 and its computing devices 304-308 identified, the catalog customization engine 404 may retrieve the first software catalog from the computing system provider website or the catalog storage system 208, and identify only the software updates that are both included in the first software catalog and provided for the computing devices 304-308 in the computing system 300. In a specific example, at block 604, the catalog customization engine 404 may identify software files/metadata in the first software catalog that provide for the update of the firmware 304a in the computing device 304, identify software files/metadata in the first software catalog that provide for the update of the driver(s) 306a in the computing device 306, and identify software files/metadata in the first software catalog that provide for the update of the BIOS 308a in the computing device 308. In some of the examples below, the software files/metadata that is included in the first software catalog and that is identified by the catalog customization engine 404 at block 604 may provide for the update of software for a remote access controller (e.g., the iDRAC discussed above), an OME management consoles, and/or any of a variety of server components that are known in the art to be provided in a server device. Upon identifying the software files/metadata, the catalog customization engine 404 may generate a second software catalog that includes those software files/metadata, which are a subset of the software files/metadata that were provided by the computing system provider in the first software catalog.

The method 600 then proceeds to block 606 where the catalog customization system creates a second software catalog hash from the second software catalog, and may retrieve at least one security policy for the second software catalog. In an embodiment, at block 606, the catalog customization engine 404 may perform a hashing operation on the second software catalog generated at block 604 in order to create a second software catalog hash. One of skill in the art in possession of the present disclosure will recognize that the hashing operation performed at block 606 may include the use of a hash function that is configured to map the data included in the second software catalog to a second software catalog hash having a fixed size. In specific embodiments, the hash function utilized by the catalog customization engine 404 at block 606 may include the Secure Hash Algorithm 256 (SHA-256), SHA-512, and/or any other hash function that would be apparent to one of skill in the art in possession of the present disclosure. Following the hashing operation, the catalog customization engine 206 may store the second software catalog in the catalog storage system 208, and one of skill in the art in possession of the present disclosure will recognize that following the creation of the second software catalog hash, the integrity of any software catalog that is identified (or identifies itself) as the second software catalog that was stored in the catalog storage system 208 may be verified by subjecting that software catalog to the same hashing operation that was used to create the second software catalog hash, and determining whether the hash value that results matches the second software catalog hash.

In some embodiments, at block 606, the catalog customization engine 404 may also retrieve at least one security policy for the second software catalog. For example, one or more security policies may be provided by the user of the management system 210 (e.g., a network administrator requesting the creation of the customized software catalog from the first software catalog), and may allow the user to define how the second software catalog may be used by computing systems (e.g., defining a number of times the second software catalog may be used, a time of day the second software catalog may be used, computing systems with which the second software catalog may be used, etc.) However, in other embodiments, the one or more security policies may be provided by the computing system provider and stored in the catalog customization database 406, and may define how any or all of the software files in the first software catalog may be used by computing devices in computing systems. While a few examples have been provided, one of skill in the art in possession of the present disclosure will recognize that security policies for a customized software catalog may be provided by a variety of entities, and may be provided to enforce any of a variety of security policies known in the art, while remaining within the scope of the present disclosure. As such, at block 606, the catalog customization engine 404 may retrieve security policies from the catalog customization database 406 that correspond to the software files that were included in the second software catalog. However, in some embodiments, the retrieval of one or more security policies at block 606 may be skipped, and the security policy functionality discussed below may be omitted from the method 600.

The method then proceeds to block 608 where the catalog customization system generates a first blockchain transaction including a smart contract having the second software catalog hash and, in some embodiments, the at least one security policy, and broadcasts the first blockchain transaction to blockchain device(s). In an embodiment, at block 608, the catalog customization engine 404 in the catalog customization system 400 may operate to generate a blockchain transaction that is directed to a blockchain address, and that includes a smart contract having the second software catalog hash and, in some embodiments, the at least one security policy. For example, the catalog customization engine 404 may be configured to generate smart contracts for provisioning on a blockchain that is maintained by the blockchain devices 212a-c in the blockchain-based secure catalog customization system 200. As would be understood by one of skill in the art in possession of the present disclosure, the blockchain devices 212a-c may operate to maintain a blockchain utilized in the blockchain-based secure catalog customization system 200 by receiving blockchain transactions broadcast by the catalog customization systems in the blockchain-based secure catalog customization system 200, validating those blockchain transactions in "blocks" that may include a plurality of blockchain transactions, and then appending those blocks to the blockchain (i.e., to blocks that were previously appended to the blockchain.) Furthermore, one of skill in the art in possession of the present disclosure will recognize that the appending of blocks to the blockchain may be accomplished via proofof-work methods, proof-of-stake methods, and/or other block verification and appending methods known in the art. As such, the smart contract utilized in the blockchain-based secure catalog customization system 200 may be provided on the blockchain in a first blockchain transaction that is broadcast by the catalog customization system 206/400, with that first blockchain transaction associated with a blockchain address to which the first blockchain transaction was directed.

In a specific example, the code generated to provide the smart contract at block 608 in the blockchain-based secure catalog customization system 200 may include the following:

```
function CREATE_SIGNING {
Input: requesterID, PayloadHash, targetAPP_ID, DRM_APP_ID
   if (requester.account!=true)
      console.log("Invalid Account");
      return error_status;
   else if (requester.account.profile.role!="Administrator")
      console.log("Invalid Account and authorization");
      return error_status
   signing_algorithm=getSigningAlgorithm( )
   requester.security_profile.sign_algorithm=signing_algorithm;
   requester.security_profile.targetID=targetID;
   requester.security_profile.signature=sign_payload(signing_algorithm, payloadHash, DRM_APP_ID, targetAppID);
   return successful;
}
function VERIFY_SIGNATURE {
Input appID
   if (requester.account!=true)
      console.log("Invalid Account");
      return error_status;
   if(requester.security_profile.targetAppID!=appID) {
      console.log("Failed to verify the application instance (s)"):
      return error_status;
   requester.model.signature=verify(security_profile);
   return successful;
}
```

One of skill in the art in possession of the present disclosure will recognize that code, such as the example code provided for the smart contract above, may be generated by the catalog customization engine 404 based on the second software catalog hash and, in some embodiments, one or more security policies, and provided in a first blockchain transaction that is directed to a blockchain address (and that may include an amount of cryptocurrency required to have the blockchain devices validate that first blockchain transaction.) While one of skill in the art in possession of the present disclosure will appreciate that the example code provided for the smart contract above is relatively simple code that provides for the authentication and authorization of an account (e.g., a network administrator account and DRM application account) and the verification of a hash value with the second software catalog hash, smart contracts according to the teachings of the present disclosure may include code that provides for a variety of functionality (including any of the security policy functionality discussed below) that will fall within the scope of the present disclosure as well.

As such, smart contract(s) may be provided by the catalog customization engine 404 in association with respective blockchain addresses in a blockchain for each customized software catalog that is created by a customer using a catalog customization system. In an embodiment, at block 608, the catalog customization engine 404 in the catalog customization system 400 may broadcast the first blockchain transaction (via the communication system 408 and the network 206) such that it is received by the blockchain devices 212*a-c*/500. As such, at block 606, the catalog customization systems like the catalog customization system 400 may broadcast the first blockchain transaction(s) discussed above anytime a software catalog that was created by the computing system provider is customized While a few specific examples of the broadcasting of first blockchain transactions has been described, one of skill in the art in possession of the present disclosure will recognize that blockchain transactions may be broadcast in a variety of manners that will fall within the scope of the present disclosure as well.

The method 600 then proceeds to block 610 where the blockchain device(s) receive the first blockchain transaction and provide the smart contract on a blockchain in association with a blockchain address. In an embodiment, at block 610, the blockchain engine 504 in any of the blockchain devices 212*a-c*/500 receiving that first blockchain transaction (e.g., through its communication system 508 and via the network 204) will then validate that first blockchain transaction and add the code included therein to the blockchain in association with the blockchain address to which the first blockchain transaction was directed, which operates to provide the smart contract on the blockchain (i.e., in association with that blockchain address.) Furthermore, one of skill in the art in possession of the present disclosure will recognize that, in some embodiments, the second software catalog hash included in the smart contract may be obfuscated or otherwise inaccessible/unviewable via the blockchain in order to secure the value of that second software catalog hash for use as described below. As such, as discussed in further detail below, subsequent blockchain transactions that are directed to that blockchain address and received by the blockchain devices will cause those blockchain devices to execute that code/smart contract.

The method 600 may then proceed to the method 700 which, as discussed below, operates to verify customized catalogs using the customized catalog smart contract provided on the blockchain in the method 600. The method 700 begins at block 702 where the computing system receives a customized software catalog, generates a hash value using the customized software catalog, and generates a second blockchain transaction that includes the hash value and that is directed to the blockchain address. In an embodiment, the computing engine 303 in the computing system 300 may receive and/or retrieve a customized software catalog (through its communication system 308 and via the network 204) from a variety of sources that would be apparent to one of skill in the art in possession of the present disclosure. In some examples, the customized software catalog received by the computing engine 303 in the computing system 300 at block 702 may include any software catalog that is not signed by the computing system provider.

At block 702, the computing engine 303 in the computing system 300 may then operate to generate a hash value using the customized software catalog. For example, computing systems participating in the method 700 may be configured to utilize, on any customized software catalog that is received, the same hash function used by the catalog customization system 206 to create software catalog hashes (e.g., like the second software catalog hash discussed above). As such, at block 702, the computing engine 303 in the computing system 300 may perform a hashing operation on the customized software catalog received at block 702 in order to create a hash value, and that hashing operation may include the use of the same hash function discussed above with reference to block 606 of the method 600, which is configured to map the data included in the customized software catalog to a hash value having a fixed size (e.g., SHA-256, SHA-512, and/or any other hash function that would be apparent to one of skill in the art in possession of the present disclosure.)

Furthermore, at block 702, the computing engine 303 in the computing system 300 may operate to generate a second blockchain transaction that is directed to the blockchain address with which the smart contract was associated during the method 600, and that includes the hash value. For example, any computing system participating in the method 700 may be configured to generate blockchain transactions directed to a blockchain address that has previously been associated with the smart contract that was provided to verify customized software catalogs for that computing system. As such, the computing engine 303 in the computing system 300 operates at block 702 to generate and broadcast the second blockchain transaction that includes the hash value created from the customized software catalog, and that may include a variety of other information such as, for example, user credentials, computing system credentials, computing system identifiers, and/or any other information that would be apparent to one of skill in the art in possession of the present disclosure as being used to provide for the security policy functionality discussed below.

The method 700 then proceeds to block 704 where the blockchain devices receive the second blockchain transaction and execute the smart contract associated with the blockchain address included in the second blockchain transaction. In an embodiment, at block 704, the blockchain engine 504 in any of the blockchain devices 212*a-c*/500 may receive the second blockchain transaction broadcast by the computing system 300, and execute the smart contract associated with that blockchain address. For example, at block 704, the blockchain engine 504 in any or all of the blockchain devices 208*a-c*/500 may receive the second blockchain transaction broadcast by the computing system 300 at block 702 (e.g., via its communication system 508 and the network 204) and, in response, validate that second blockchain transaction and access and execute the smart contract that was stored on the blockchain in association with the blockchain address to which that second blockchain transaction is directed. For example, the validation of the second blockchain transaction by the blockchain engine 504 in the blockchain devices 212*a-c*/500 at block 608 may include determining that the second blockchain transaction satisfies consensus rules enforced by the blockchain devices 212*a-c*/500, determining that the second blockchain transaction includes a required amount of a cryptocurrency fee, and/or performing a variety of other blockchain transaction validation operations that would be apparent to one of skill in the art in possession of the present disclosure.

The method 700 then proceeds to decision block 706 where the blockchain device(s) determine whether the smart contract indicates that the hash value included in the second blockchain transaction matches the second software catalog hash associated with the smart contract and, in some embodiments, whether the at least one security policy is satisfied. In an embodiment, at decision block 706, the execution of the code that provides the smart contract by blockchain engine 504 in the blockchain devices 212*a-c*/500 allows the blockchain devices 208*a-c* to determine whether the hash value included in the second blockchain transaction broadcast by the computing system 300 matches the second software catalog hash that was created for the second software catalog during the method 600 and included as part of the smart contract. As will be appreciated by one of skill in the art in possession of the present disclosure, the appending of the block that includes the second blockchain transaction to the blockchain, as described above, provides for the accessing and execution of the code that provides the smart contract associated with the blockchain address that was included in that second blockchain transaction.

Wth reference to the example code provided for the smart contract above, the execution of that code by the blockchain engine 504 in the blockchain devices 212*a-c*/500 may provide for the verification of an account of a user of the computing system used to broadcast the second blockchain transaction, the verification of the computing system used to broadcast the second blockchain transaction (e.g., by verifying that an identifier of the computing system 300 included in the blockchain transaction is associated with a computing system identifier in a computing system database (not illustrated) coupled to the network 206), and/or the determination of whether the hash value provided for the computing system 300 matches the second software catalog hash that was generated from the second software catalog and included in the smart contract. Furthermore, as discussed above, in some embodiments the execution of the code for the smart contract may provide for the determination of whether any security policies have been satisfied. As such, in addition to the user account authentication and computing system authentication described above, any other security policies may be enforced via the execution of the smart contract, including security policies defining how many times the second software catalog may be utilized, the time of day the second software catalog may be utilized, and/or a variety of security policies that would be apparent to one of skill in the art in possession of the present disclosure.

If, at decision block 706, the blockchain device(s) determine that the smart contract indicates that the hash value matches the second software catalog hash and the at least one security policy is satisfied, the method 700 proceeds to block 708 where the blockchain device(s) store the second blockchain transaction in a blockchain, and transmit a second software catalog verification to the computing system. In an embodiment, at block 708, the blockchain engine 504 in the blockchain device(s) 208*a-c*/500 may determine, via its execution of the smart contract as discussed above, that the smart contract indicates that the hash value provided by the computing system 300 for the customized software catalog received at block 702 matches the second software catalog hash generated from the second software catalog and included in the smart contract. Furthermore, in some embodiments, at block 708 the blockchain engine 504 in the blockchain device(s) 208*a-c*/500 may determine, via its execution of the smart contract as discussed above, that the smart contract indicates that any security policies associated with the second software catalog are satisfied. In response, the smart contract may provide for the transmittal of a software catalog verification in response to the indication that the hash value provided by the computing system 300 for the customized software catalog received at block 702 matches the second software catalog hash generated from the second software catalog.

In some embodiments, the determination at block 706 that the at least one security policy has been satisfied may cause the blockchain device to include a key in the second software catalog verification that is configured to provide access to the software updates included in the second software catalog. For example, the smart contract may be configured to release a key to the blockchain devices 212a-c for accessing software updates in the second software catalog in response to the hash value matching the second software catalog hash and each of the security policies for the second software catalog being satisfied, and the blockchain devices 212a-c may provide that key in the second software catalog verification. As such, at block 708, the blockchain engine 504 in the blockchain device 500 may transmit a software catalog verification including that key (e.g., via its communication system 508) through the network 206 to the computing system 300. One of skill in the art in possession of the present disclosure will recognize that the software catalog verification transmitted at block 708 may include a variety of information while remaining within the scope of the present disclosure. One of skill in the art in possession of the present disclosure will recognize that the second blockchain transaction is stored permanently on the blockchain by the blockchain devices 212a-c, providing an immutable record of customized software catalog verification.

The method 700 then proceeds to block 710 where the computing system causes an update of software in the computing device(s) using the second software catalog. As discussed above, in some embodiments, the computing engine 303 in the computing system 300 may utilize the key included in the second software catalog verification in order to unlock the second software catalog, and access the software files/metadata included therein. However, in other embodiments, the security policy functionality discussed above may be omitted, and the accessing of the software files/metadata in the second software catalog may be performed in response to the hash value matching the second software catalog hash. As such, at block 710, first software providing the firmware 304a in the computing device 304 may be replaced with second software (e.g., to provide a new version (i.e., upgrade) of the firmware 304a). Similarly, at block 710, first software providing the driver(s) 306a in the computing device 306 may then be replaced with second software (e.g., to provide a new version (i.e., upgrade) of the driver(s) 306a). Similarly, at block 710, first software providing the BIOS 308a in the computing device 308 may then be replaced with second software (e.g., to provide a new version (i.e., upgrade) of the BIOS 308a). As such, if the execution of the smart contract indicates that the hash value provided by the computing system 300 for the customized software catalog received at block 702 matches the second software catalog hash generated from the second software catalog, the computing system 300 uses the second software catalog to provide a software update to the computing device(s) 304-308 that may provide a software upgrade to those devices.

If, at decision block 708, the blockchain device(s) determine that the smart contract indicates that the hash value does not match the second software catalog hash or the at least one security policy is not satisfied, the method 700 proceeds to block 712 where the blockchain device(s) store the second blockchain transaction in the blockchain, ay and transmit a customized software catalog warning message to the computing system. In an embodiment, at block 616, the blockchain engine 504 in the blockchain device(s) 208a-c/500 may determine, via its execution of the smart contract as discussed above, that the smart contract indicates that the hash value provided by the computing system 300 for the customized software catalog received at block 702 does not match the second software catalog hash generated from the second software catalog. For example, the software catalog warning message may include a warning that the customized software catalog cannot be verified and should not have its software updates installed on the computing system 300, a message that the customized software catalog was verified but cannot have its software updates installed on the computing system 300 due to security policies not being satisfied, and/or any other information that would be apparent to one of skill in the art in possession of the present disclosure. As discussed above, one of skill in the art in possession of the present disclosure will recognize that the second blockchain transaction is stored permanently on the blockchain by the blockchain devices 212a-c, providing an immutable record of the unverifiable customized software update.

While specific examples of the blockchain-based secure customized catalog system have been described, one of skill in the art in possession of the present disclosure will recognize that a variety of modifications may be made to the details provided above while remaining within the scope of the present disclosure. For example, the software updates provided above may be replaced by a variety of computing system configurations, which one of skill in the art in possession of the present disclosure will recognize may be pushed to computing systems, and the systems and methods of the present disclosure will allow for the integrity verification of those configurations in substantially the same manners as described above for software update verification.

Thus, systems and methods have been described that provide for the verification of customized software catalogs that have been customized by a customer from a secure software catalog that was previously created and cryptographically signed by a computing system provider. This is accomplished, at least in part, by generating a customized software catalog hash for the customized software catalog, and providing a smart contract that includes that customized software catalog hash as part of a first blockchain transaction that is generated and broadcast to blockchain devices. Upon receiving that first blockchain transaction, the blockchain devices will add the smart contract to a blockchain in association with a blockchain address. Subsequently, when computing systems wish to utilize the customized software catalog, they may generate a hash value using the customized software catalog, and provide it in a second blockchain transaction that is broadcast to the blockchain devices and directed to the blockchain address. Upon receiving that second blockchain transaction, the blockchain devices will execute the smart contract at the blockchain address, and if the execution of the smart contract indicates that the hash value matches the customized software catalog hash, provide a customized software catalog verification to the computing system that verifies the integrity of the customized software catalog. As such, the computing system may apply the software updates via the customized software catalog without the risk of installing malicious software.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A blockchain-based secure customized catalog system, comprising:
    a computing system that includes a plurality of computing devices;
    a catalog customization system that is coupled to the computing system and that is configured to:

receive a request to customize a first software catalog;
retrieve the first software catalog from a catalog storage system;
modify the first software catalog to create a second software catalog that is customized for the computing devices in the computing system;
perform a hashing operation on the second software catalog to create a second software catalog hash;
generate a first blockchain transaction that includes a smart contract having the second software catalog hash; and
broadcast the first blockchain transaction; and
a blockchain device that is coupled to the catalog customization system and that is configured to:
receive the first blockchain transaction broadcast by the catalog customization system and, in response, provide the smart contract on a blockchain in association with a blockchain address;
receive a second blockchain transaction broadcast by the computing system, that is directed to the blockchain address, and that includes a hash value;
execute the smart contract associated with the blockchain address; and
determine that the execution of the smart contract has provided an indication that the hash value matches the second software catalog hash and, in response, transmit a second software catalog verification to the computing system.

2. The system of claim 1, wherein the catalog customization system is configured to:
retrieve at least one security policy; and
provide the at least one security policy in the smart contract included in the first blockchain transaction.

3. The system of claim 2, wherein the blockchain device is configured to:
determine that the execution of the smart contract has provided the indication that the hash value matches the second software catalog hash and that the at least one security policy has been satisfied and, in response, transmit the second software catalog verification to the computing system.

4. The system of claim 3, wherein the blockchain device is configured to:
provide a second software catalog key in the second software catalog verification in response to determining that the at least one security policy has been satisfied, wherein the second software catalog key is configured to allow software updates associated with the second software catalog to be installed on the computing system.

5. The system of claim 1, further comprising:
a catalog storage system coupled to the catalog customization system, wherein the catalog customization system is configured to:
retrieve the first software catalog from the catalog storage system; and
store the second software catalog in the catalog storage system.

6. The system of claim 1, wherein the computing system is configured to:
receive, from the blockchain device, the second software catalog verification; and
use the second software catalog to perform a software updates on the plurality of computing devices.

7. An Information Handling System (IHS), comprising:
a processing system; and
a memory system that is coupled to the processing system and that includes instructions that, when executed by the processing system, cause the processing system to provide a blockchain engine that is configured to:
receive a first blockchain transaction that was broadcast by a catalog customization system and that includes a first smart contract having a second software catalog hash that was created from a second software catalog that was generated by modifying a first software catalog;
provide, in response to receiving the blockchain transaction, the first smart contract on a blockchain in association with a first blockchain address;
receive a second blockchain transaction broadcast by a first computing system, that is directed to the first blockchain address, and that includes a first hash value;
execute the first smart contract associated with the first blockchain address; and
determine that the execution of the first smart contract has provided an indication that the first hash value matches the second software catalog hash and, in response, transmit a second software catalog verification to the first computing system.

8. The IHS of claim 7, wherein the first smart contract that is included in the first blockchain transaction includes at least one first security policy.

9. The IHS of claim 8, wherein the blockchain engine is configured to:
determine that the execution of the first smart contract has provided the indication that the first hash value matches the second software catalog hash and that the at least one first security policy has been satisfied and, in response, transmit the second software catalog verification to the first computing system.

10. The IHS of claim 9, wherein the blockchain engine is configured to:
provide a second software catalog key in the second software catalog verification in response to determining that the at least one first security policy has been satisfied, wherein the second software catalog key is configured to allow software updates associated with the second software catalog to be installed on the first computing system.

11. The IHS of claim 7, wherein the blockchain engine is configured to:
receive a third blockchain transaction that was broadcast by the catalog customization system and that includes a second smart contract having a third software catalog hash that was created from a third software catalog that was generated by modifying the first software catalog;
provide, in response to receiving the third blockchain transaction, the second smart contract on the blockchain in association with a second blockchain address;
receive a fourth blockchain transaction broadcast by a second computing system, that is directed to the second blockchain address, and that includes a second hash value;
execute the second smart contract associated with the second blockchain address; and
determine that the execution of the second smart contract has provided an indication that the second hash value matches the third software catalog hash and, in response, transmit a third software catalog verification to the second computing system.

12. The IHS of claim 7, wherein the blockchain engine is configured to:

receive a third blockchain transaction broadcast by a second computing system, that is directed to the first blockchain address, and that includes a second hash value;

execute the first smart contract associated with the first blockchain address; and determine that the execution of the first smart contract has provided an indication that the second hash value does not match the second software catalog hash and, in response, transmit the second software catalog warning to the second computing system.

13. The IHS of claim 7, wherein the blockchain engine is configured to:

store the third blockchain transaction in the blockchain.

14. A method for providing blockchain-based secure customized catalogs, comprising:

receiving, by the blockchain device, a first blockchain transaction that was broadcast by a catalog customization system and that includes a first smart contract having a second software catalog hash that was created from a second software catalog that was generated by modifying a first software catalog;

providing, by the blockchain device in response to receiving the blockchain transaction, the first smart contract on a blockchain in association with a first blockchain address;

receiving, by the blockchain device, a second blockchain transaction broadcast by a first computing system, that is directed to the first blockchain address, and that includes a first hash value;

executing, by the blockchain device, the first smart contract associated with the first blockchain address; and determining, by the blockchain device, that the execution of the first smart contract has provided an indication that the first hash value matches the second software catalog hash and, in response, transmit a second software catalog verification to the first computing system.

15. The method of claim 14, wherein the first smart contract that is included in the first blockchain transaction includes at least one first security policy.

16. The method of claim 15, further comprising:

determining, by the blockchain device, that the execution of the first smart contract has provided the indication that the first hash value matches the second software catalog hash and that the at least one first security policy has been satisfied and, in response, transmit the second software catalog verification to the first computing system.

17. The method of claim 16, further comprising:

providing, by the blockchain device, a second software catalog key in the second software catalog verification in response to determining that the at least one first security policy has been satisfied, wherein the second software catalog key is configured to allow software updates associated with the second software catalog to be installed on the first computing system.

18. The method of claim 14, further comprising:

receiving, by the blockchain device, a third blockchain transaction that was broadcast by the catalog customization system and that includes a second smart contract having a third software catalog hash that was created from a third software catalog that was generated by modifying the first software catalog;

providing, by the blockchain device in response to receiving the third blockchain transaction, the second smart contract on the blockchain in association with a second blockchain address;

receiving, by the blockchain device, a fourth blockchain transaction broadcast by a second computing system, that is directed to the second blockchain address, and that includes a second hash value;

executing, by the blockchain device, the second smart contract associated with the second blockchain address; and determining, by the blockchain device, that the execution of the second smart contract has provided an indication that the second hash value matches the third software catalog hash and, in response, transmit a third software catalog verification to the second computing system.

19. The method of claim 14, further comprising:

receiving, by the blockchain device, a third blockchain transaction broadcast by a second computing system, that is directed to the first blockchain address, and that includes a second hash value;

executing, by the blockchain device, the first smart contract associated with the first blockchain address; and determining, by the blockchain device, that the execution of the first smart contract has provided an indication that the second hash value does not match the second software catalog hash and, in response, transmit the second software catalog warning to the second computing system.

20. The method of claim 14, further comprising:

storing, by the blockchain device, the third blockchain transaction in the blockchain.

* * * * *